UNITED STATES PATENT OFFICE.

HENRY H. BECKER, OF CHICAGO, ILLINOIS.

POLISHING COMPOUND.

SPECIFICATION forming part of Letters Patent No. 296,112, dated April 1, 1884.

Application filed September 24, 1883. (No specimens.)

*To all whom it may concern:*

Be it known that I, HENRY H. BECKER, a citizen of the United States, residing at Chicago, in the county of Cook and State of Illinois, have invented certain new and useful Improvements in Polishing Compounds, of which the following is a specification, to wit:

This invention relates to an improvement in compounds for polishing tinware, metals, glass, &c.; and it consists in a composition of bone, ashes, and slate, substantially as will be hereinafter more fully set forth.

In order to enable others skilled in the art to which my invention appertains to make and use the same, I will now proceed to describe the method of compounding and using it.

I use in this compound bone-dust ground very fine, ashes, (preferably hard-coal,) and slate obtained from the ashes after burning, in about the following proportions, viz: bone, sixty parts; ashes, thirty parts; slate, ten parts. These ingredients, in about the proportions named, are thoroughly mixed together and form a compound of great utility in polishing tin, glass, and metals of all kinds, and is applied with a dry woolen or other soft cloth.

Having thus fully described my invention, what I claim as new, and desire to secure by Letters Patent, is—

The polishing compound herein described, consisting of bone, ashes, and slate, compounded in substantially the manner and proportions herein specified.

In testimony whereof I affix my signature in presence of two witnesses.

HENRY H. BECKER.

Witnesses:
 CHAS. KRESSMANN,
 FRANK JOHNSON.